(12) United States Patent
Labrozzi

(10) Patent No.: US 12,382,112 B2
(45) Date of Patent: Aug. 5, 2025

(54) TARGETED RE-PROCESSING OF DIGITAL CONTENT

(71) Applicant: Disney Enterprises, Inc., Burbank, CA (US)

(72) Inventor: Scott Labrozzi, Cary, NC (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/873,511

(22) Filed: Jul. 26, 2022

(65) Prior Publication Data

US 2024/0040167 A1  Feb. 1, 2024

(51) Int. Cl.
| | |
|---|---|
| *H04N 21/234* | (2011.01) |
| *G06Q 30/0251* | (2023.01) |
| *H04N 21/81* | (2011.01) |
| *H04N 21/845* | (2011.01) |

(52) U.S. Cl.
CPC ... *H04N 21/23424* (2013.01); *G06Q 30/0264* (2013.01); *H04N 21/812* (2013.01); *H04N 21/8455* (2013.01)

(58) Field of Classification Search
CPC ........... H04N 21/23424; H04N 21/812; H04N 21/8455; G06Q 30/0264
See application file for complete search history.

(56) References Cited

U.S. PATENT DOCUMENTS

| | | |
|---|---|---|
| 8,752,085 B1 | 6/2014 | Brueck et al. |
| 11,218,784 B1 * | 1/2022 | Mekuria ............... H04N 21/84 |
| 2006/0029093 A1 | 2/2006 | Rossum |
| 2007/0204310 A1 | 8/2007 | Hua et al. |

(Continued)

FOREIGN PATENT DOCUMENTS

| | | |
|---|---|---|
| JP | 11-215458 | 8/1999 |
| JP | 2009-535922 | 10/2009 |

(Continued)

OTHER PUBLICATIONS

Extended European Search Report for EP Application 23179662.4 dated Dec. 5, 2023.

(Continued)

*Primary Examiner* — Nathan J Flynn
*Assistant Examiner* — Christine A Kurien
(74) *Attorney, Agent, or Firm* — Farjami & Farjami LLP

(57) ABSTRACT

A system includes a computing platform having processing hardware, and a memory storing software code. The software code is executed to receive digital content indexed to a timeline, receive insertion data identifying a timecode of the timeline, and encode the digital content using the insertion data to provide segmented content having a segment boundary at the timecode, and first and second segments adjoining the segment boundary, wherein the first segment precedes, and the second segment succeeds, the segment boundary. The software code also re-processes the first and second segments to apply a fade-out within or to the first segment and a fade-in within or to the second segment, wherein re-processing the first and second segments provides encoded segments having the segment boundary configured as an insertion point for supplemental content.

20 Claims, 4 Drawing Sheets

(56) References Cited

U.S. PATENT DOCUMENTS

| | | | |
|---|---|---|---|
| 2008/0276266 A1* | 11/2008 | Huchital | H04N 21/8133 |
| | | | 725/32 |
| 2018/0225676 A1* | 8/2018 | Yruski | G06Q 30/0241 |
| 2019/0035431 A1* | 1/2019 | Attorre | G10L 25/30 |
| 2020/0359082 A1 | 11/2020 | Ashbacher et al. | |
| 2021/0112313 A1 | 4/2021 | Neumeier et al. | |

FOREIGN PATENT DOCUMENTS

| | | |
|---|---|---|
| JP | 2013-176103 | 9/2013 |
| JP | 2016-149802 | 8/2016 |
| JP | 2020-519055 | 6/2020 |
| JP | 2021-064943 | 4/2021 |

OTHER PUBLICATIONS

Notice of Reason for Refusal dated Nov. 12, 2024 for Application JP 2023-099104.

* cited by examiner

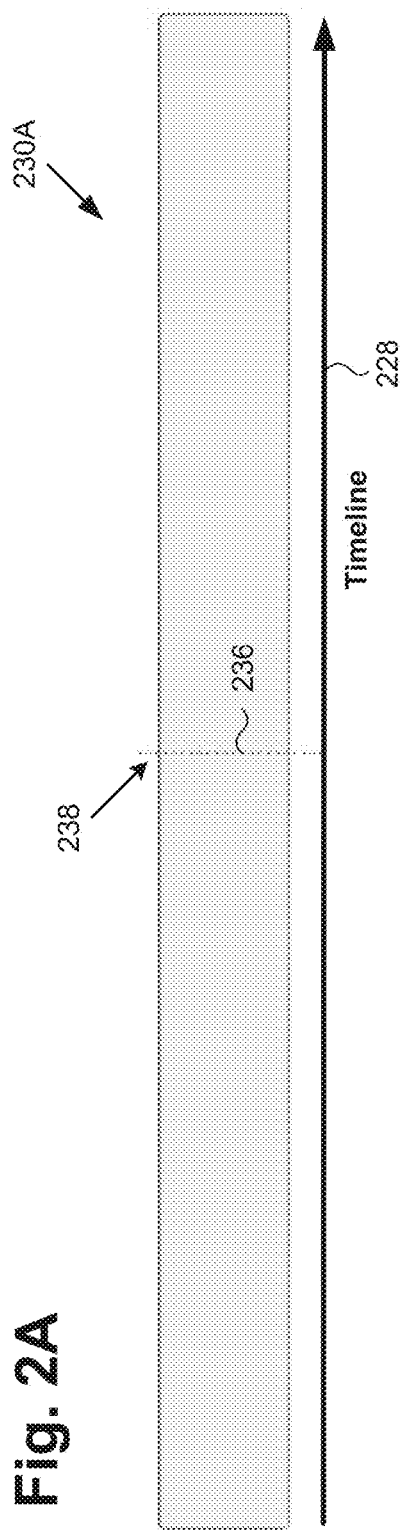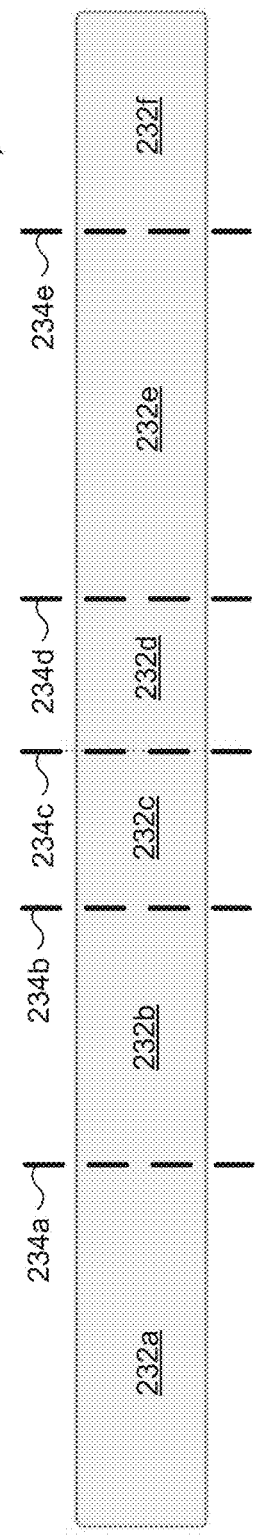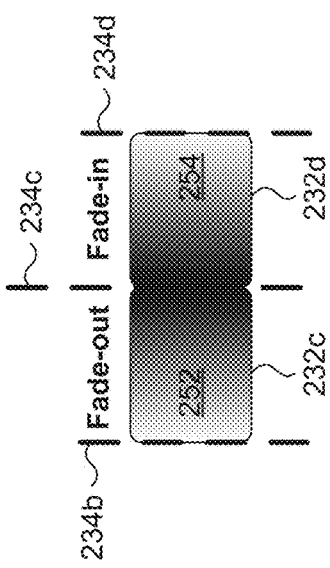

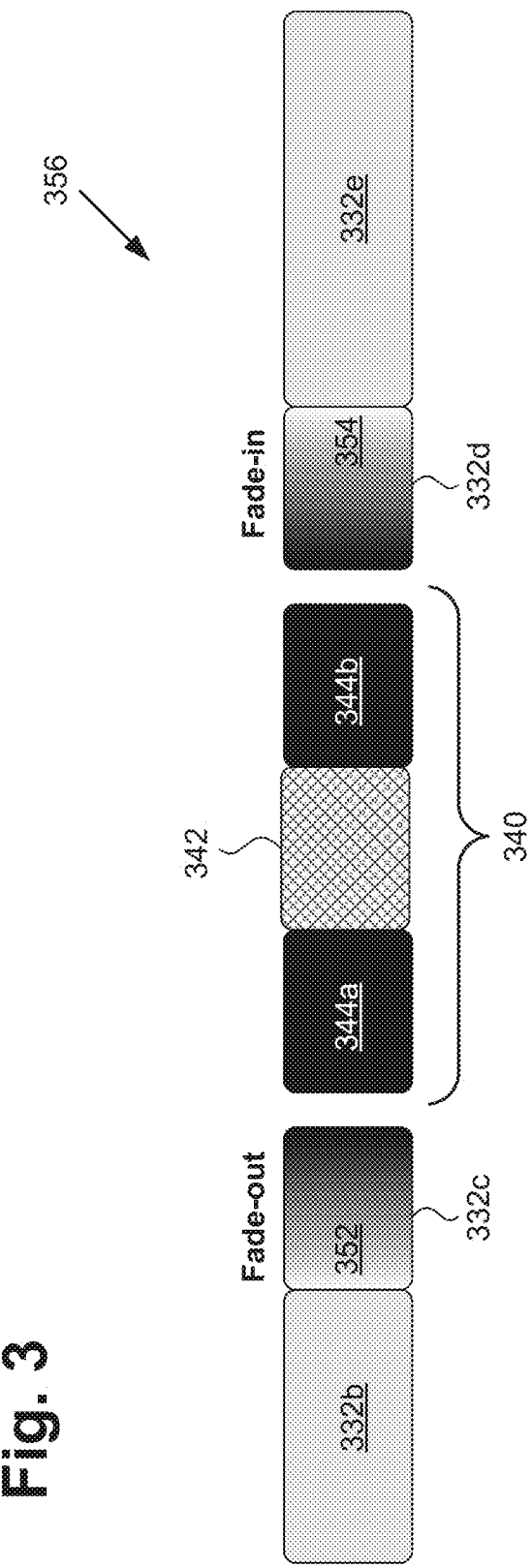

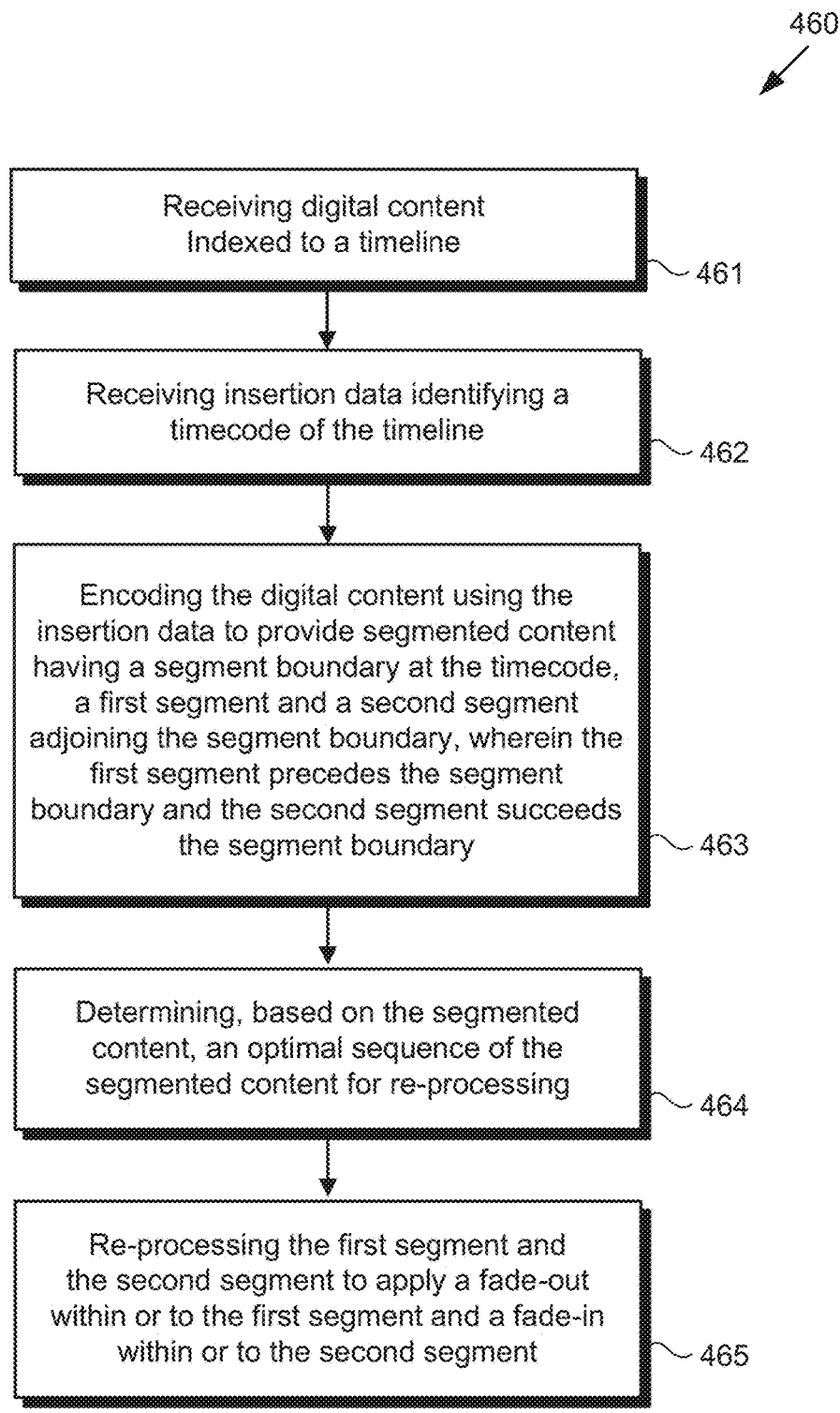

TARGETED RE-PROCESSING OF DIGITAL CONTENT

BACKGROUND

Due to its nearly universal popularity as a content medium, ever more audio-video (AV) content is being produced and made available to consumers. Moreover, as streaming platforms have become increasingly important distribution hubs for AV content, adjustable bit-rate (ABR) AV content has become increasingly important as well, due to variable network conditions and differences in data processing capabilities among the wide variety of consumer devices that receive streaming content. As a result, the efficiency with which AV content, including ABR content, can be supplemented or enhanced post production has become increasingly important to the producers, owners, and distributors of that content.

By way of example, in some use cases it may be advantageous or desirable to add supplemental content, such as advertisements (ads) for instance, to existing AV content, post production. In cases in which the AV content was originally produced without predetermined insertion points for supplemental content, introducing that content post production can result in an unpleasant or confusing experience for a consumer viewing the content during playback. For example, an ad that has been naively inserted into AV content may appear mid-scene, or even mid-shot, thereby jarringly disrupting the viewing experience of the consumer. A conventional approach to adding supplemental content that avoids viewer disruption and aesthetic unpleasantness is to re-encode the content in its entirety, this time taking into account splice points for use in conditioning segment boundaries for ads or other supplemental content. However, this conventional approach is undesirably, and in some instances impracticably, expensive in terms both of compute time and the quality control (QC) review required for the re-encoded content.

BRIEF DESCRIPTION OF THE DRAWINGS

FIG. 2A shows an exemplary diagram depicting a marker identifying a timecode for insertion of supplemental content to existing digital content, according to one implementation;

FIG. 2B shows an exemplary diagram depicting the digital content of FIG. 2A after encoding to produce segment boundaries, according to one implementation;

FIG. 2C shows an exemplary diagram depicting the digital content of FIGS. 2A and 2B after targeted re-processing to apply a fade-out and a fade-in within or to respective segments adjoining the segment boundary at the timecode identified by the marker of FIG. 2A, according to one implementation;

FIG. 3 shows an exemplary diagram in which supplemental content is introduced into the insertion point after re-processing to apply the fade-out and fade-in of FIG. 2C, according to one implementation; and FIG. 4 shows a flowchart outlining an exemplary method for targeted re-processing of digital content, according to one implementation, according to one implementation.

DETAILED DESCRIPTION

Figure 1:
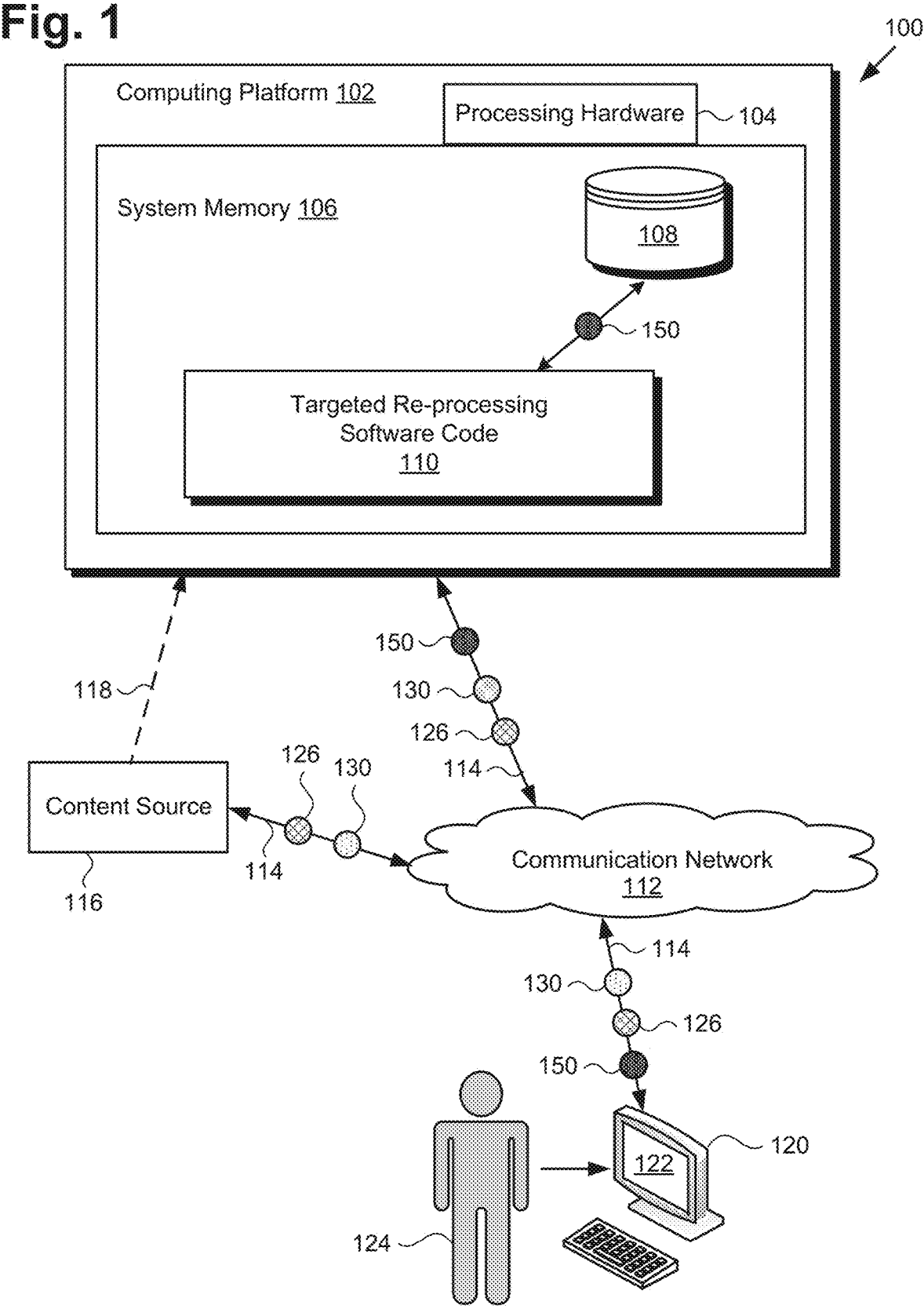
FIG. 1 shows a diagram of an exemplary system for targeted re-processing of digital content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, in cases in which the audio-video (AV) content is originally produced without predetermined insertion points for supplemental content, introducing that content post production can result in an unpleasant or confusing experience for a consumer viewing the content during playback. For example, supplemental content in the form of an advertisement (hereinafter "ad") that has been naively inserted into AV content may appear mid-scene, or even mid-shot, thereby jarringly disrupting the viewing experience of the consumer. A conventional approach to adding supplemental content that avoids viewer disruption and aesthetic unpleasantness is to re-process the content in its entirety, this time taking into account splice points for use in conditioning segment boundaries for ads or other supplemental content. However and as also noted above, this conventional approach is undesirably, and in some instances impracticably, expensive in terms both of compute time and the quality control (QC) review required for the re-processed content.

The present application discloses systems and methods for targeted re-processing of digital content. It is noted that, as defined in the present application, the expression "targeted re-processing" may refer to one or both of the selective re-processing of one or more sections of content that has previously been transcoded, but less than all of that content, or the selective targeted modification to a media playlist for the introduction of black segments, such as black slugs as known in the art, in order to enable the introduction of new supplemental content, such as ads for example, without negatively impacting the aesthetic integrity or creative intent of the original content. The targeted re-processing solution disclosed in the present application enables substantially seamless insertion of supplemental content at segment boundaries of encoded digital content by advantageously re-processing only those segments considered to be necessary to avoid subjective audio or video irregularities produced by the introduction of the supplemental content at those insertion points. Consequently, the present solution advances the state-of-the-art as described above while significantly reducing the time required to re-process, as well as the QC time required in validation, because only targeted sequences of previously encoded digital content are re-processed.

It is noted that, as defined in the present application, the feature "fade-out" refers to a transition from fully illuminated content to black, while the feature "fade-in" refers to a transition from black to fully illuminated content. Each of a fade-out and a fade-in may have a relatively brief time duration, such half a second (0.5 s) for example, or any other time interval deemed to be advantageous or desirable, and are used to provide for a pleasant subjective viewer experience when transitioning from digital content to supplemental content in the form of one or more ads, for example, and back again.

As a specific example, streaming platforms may offer subscription services that are alternatively ad-supported or ad-free. The present solution for targeted re-processing of digital content advantageously enables the delivery of content as part of an ad-free tier without fade-outs or fade-ins, and an ad-supported tier with such fade-outs and fade-ins. That is to say, the targeted re-processing solution disclosed in the present application provides a clean, non-disruptive experience for the ad-free tier (i.e., no fade-outs or fade-ins), and a pleasant transition between streaming content and ads (i.e., using fade-outs and fade-ins) for the ad-supported tier. Moreover, the present solution for targeted re-processing of digital content may advantageously be implemented using automated or substantially automated systems and methods.

As defined in the present application, the terms "automation," "automated," and "automating" refer to systems and processes that do not require the participation of a human user, such as a system administrator. For example, although in some implementations a human editor or QC technician may review the performance of the systems and methods disclosed herein, that human involvement is optional. Thus, in some implementations, the processes described in the present application may be performed under the control of hardware processing components of the disclosed systems.

It is further noted that, as defined in the present application. "digital content" may refer to a variety of different types and genres of AV content, as well as to video unaccompanied by audio, or audio unaccompanied by video. Specific examples of digital AV content include adjustable bit-rate (ABR) content in the form of movies. TV episodes or series, video games, and sporting events. In addition, or alternatively, in some implementations. "digital content" may be or include digital representations of persons, fictional characters, locations, objects, and identifiers such as brands and logos, for example, which populate a virtual reality (VR), augmented reality (AR), or mixed reality (MR) environment. Moreover, that digital content may depict virtual worlds that can be experienced by any number of users synchronously and persistently, while providing continuity of data such as personal identity, user history, entitlements, possessions, payments, and the like. It is noted that the concepts disclosed by the present application may also be applied to digital content that is a hybrid of traditional AV and fully immersive VR/AR/MR experiences, such as interactive video.

FIG. 1 shows a diagram of exemplary system 100 for targeted re-processing of digital content, according to one implementation. System 100 includes computing platform 102 having processing hardware 104, and system memory 106 implemented as a computer-readable non-transitory storage medium. As shown in FIG. 1, according to some implementations, system memory 106 stores targeted re-processing software code 110, and may optionally store content database 108.

As further shown in FIG. 1, system 100 may be implemented in a use environment including content source 116 providing non-transcoded digital content 130 (hereinafter "digital content 130") and insertion data 126 for digital content 130, communication network 112, and user 124 utilizing user system 120 including display 122. In addition, FIG. 1 shows network communication links 114 communicatively coupling content source 116 and user system 120 with system 100 via communication network 112. Also shown in FIG. 1 is re-processed content 150 corresponding to digital content 130 and provided by targeted re-processing software code 110.

It is noted that although system 100 may receive digital content 130 from content source 116 via communication network 112 and network communication links 114, in some implementations, content source 116 may take the form of a content source integrated with computing platform 102, or may be in direct communication with system 100, as shown by dashed communication link 118. It is further noted that, in some implementations, system 100 may omit one or both of content database 108. Thus, in some implementations, system memory 106 may store targeted re-processing software code 110 but not content database 108.

With respect to the representation of system 100 shown in FIG. 1, it is noted that although targeted re-processing software code 110 and optional content database 108 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts targeted re-processing software code 110 and optional content database 108 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that targeted re-processing software code 110 and optional content database 108 may be stored remotely from one another within the distributed memory resources of system 100.

Processing hardware 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as targeted re-processing software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

Moreover, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to a NN that utilizes multiple hidden layers between input and output layers, which may allow for learning based on features not explicitly defined in raw data. In various implementations, NNs may be trained as classifiers and may be utilized to perform image processing or natural-language processing.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although user system 120 is shown as a desktop computer in FIG. 1, that representation is provided merely as an example as well. More generally, user system 120 may be any suitable mobile or stationary computing device or system that implements data processing capabilities sufficient to provide a user interface, support connections to communication network 112, and implement the functionality ascribed to user system 120 herein. For example, in other implementations, user system 120 and may take the form of a laptop computer, tablet computer, or smartphone.

With respect to display 122 of user system 120, display 122 may be physically integrated with user system 120, or may be communicatively coupled to but physically separate from user system 120. For example, where user system 120 is implemented as a smartphone, laptop computer, or tablet computer, display 122 will typically be integrated with user system 120. By contrast, where user system 120 is implemented as a desktop computer, display 122 may take the form of a monitor separate from user system 120 in the form of a computer tower. Furthermore, display 122 of user system 120 may be implemented as a liquid crystal display (LCD), a light-emitting diode (LED) display, an organic light-emitting diode (OLED) display, a quantum dot (QD) display, or any other suitable display screen that performs a physical transformation of signals to light.

FIG. 2A shows an exemplary diagram depicting marker 238 identifying timecode 236 for insertion of supplemental content into digital content 230A indexed to timeline 228, according to one implementation. Digital content 230A corresponds in general to digital content 130, in FIG. 1. Thus, digital content 130 may share any of the characteristics attributed to digital content 230A by the present disclosure, and vice versa. That is to say, like digital content 230A, digital content 130 may be indexed to timeline 228. It is noted that, in some implementations, marker 238 may take the form of a fixed point candidate insertion time (FPCI) marker, for example, as known in the art.

FIG. 2B shows an exemplary diagram depicting segmented content 230B, which corresponds to digital content 230A, in FIG. 2A, after encoding to produce segment boundaries 234a, 234b, 234c, 234d, and 234e, and segments 232a, 232b. 232c, 232d, 232e, and 232f (hereinafter "segments 232a-232f"). It is noted that segment boundary 234c, in FIG. 2B, coincides with timecode 236 of timeline 228, identified by marker 238.

With respect to the sizes or segment durations of segments 232a-232f, it is noted that for a variety of reasons there may be limitations imposed on the minimum and maximum segment durations for segments 232a-232f. In a practical sense, for example, it is undesirable to have a segment that includes only a single frame. As a result, it may be the case that a streaming service has or imposes a minimum segment duration on the content they deliver. Furthermore, for some ABR protocols, the minimum and maximum segment durations may be predetermined, and those values may be included in the description of the content. For example, in Hypertext Transfer Protocol (HTTP) Live Streaming (HLS), the content playlist tag EXT-X-TARGETDURATION is required and specifies the maximum segment duration.

FIG. 2C shows an exemplary diagram depicting a portion of segmented content 230B, in FIG. 2B, after targeted re-processing of segments 232c and 232d adjoining segment boundary 234c to apply fade-out 252 to segment 232c and fade-in 254 within or to segment 232d, according to one implementation. As noted above, a fade-out or fade-in may have a timeline duration of approximately 0.5 s, or any other time interval deemed advantageous or desirable.

It is noted that, according to the exemplary implementation shown by FIG. 2C, the segment duration of segment 232c may be predetermined to match the timeline duration of fade-out 252 applied to segment 232c, while the segment duration of segment 232d may be predetermined to match the timeline duration of fade-in 254 applied to segment 232d. However, in other implementations, the segment duration of segment 232c may be greater than the timeline duration of fade-out 252, while the segment duration of segment 232d may be greater than the timeline duration of fade-in 254. Thus, in those implementations, fade-out 252 may be applied within segment 232c rather than being applied to segment 232c in its entirety, and fade-in 254 may be applied within segment 232d rather than being applied to segment 232d in its entirety. That is to say, in various implementations, fade-out 252 and fade-in 254 may be applied within or to respective segments 232c and 232d.

FIG. 3 shows an exemplary diagram in which supplemental content is introduced into the insertion point provided by re-processing of segments 232c and 232d to apply respective fade-out 252 and fade-in 254, as shown in FIG. 2C, according to one implementation. As shown in FIG. 3, supplemented digital content 352 includes originally encoded segments 332b and 332e, re-processed segments 332c, and 332d, and supplemental content 340 situated at the insertion point provided between segments 332c and 332d. As further shown in FIG. 3, supplemental content 340 includes at least new content 342, and in various implementations, may also include one or both of black segment 344a preceding new content 342 or black segment 344b succeeding new content 342.

Segments 332b and 332e correspond respectively in general to segments 232b and 232e, in FIG. 2B. Moreover, segment 332c having applied fade-out 352 and segment 332d having applied fade-in 354 correspond respectively in general to segment 232c having applied fade-out 252 and segment 232d having applied fade-in 254, in FIG. 2C. Thus, segments 232b, 232c. 232d. 232e, fade-out 252, and fade-in 254 may share any of the characteristics attributed to respective 232b, 232c. 232d, 232e, fade-out 252, and fade-in 254 by the present disclosure, and vice versa.

The functionality of system 100 and targeted re-processing software code 110 will be further described by reference to FIG. 4. FIG. 4 shows flowchart 460 presenting an exemplary method for targeted re-processing of digital content, according to one implementation. With respect to the method outlined in FIG. 4, it is noted that certain details and features have been left out of flowchart 460 in order not to obscure the discussion of the inventive features in the present application.

Referring now to FIG. 4 in combination with FIGS. 1 and 2A, flowchart 460 begins with receiving digital content 130/230A indexed to timeline 228 (action 461). Digital content 130/230A may be received in action 461 by targeted re-processing software code 110, executed by processing hardware 104 of system 100. For example, as shown in FIG. 1, in some implementations, digital content 130/230A may be received by system 100 from content source 116, either via communication network 112 and network communication links 114 or directly via communication link 118. However and as further shown in FIG. 1, in other implementations, digital content 130/230A may be received by system 100 from user system 120, via communication network 112 and network communication links 114.

As noted above, digital content 130/230A may include any of a variety of different types and genres of AV content, as well as to video unaccompanied by audio, or audio unaccompanied by video. Specific examples of digital AV content include ABR content in the form of movies, TV episodes or series, video games, and sporting events. In addition, or alternatively, in some implementations, digital content 130/230A may be or include digital representations of persons, fictional characters, locations, objects, and identifiers such as brands and logos, for example, which populate a VR. AR, or MR environment. Moreover, digital content 130/230A may depict virtual worlds that can be experienced by any number of users synchronously and persistently, while providing continuity of data such as personal identity, user history, entitlements, possessions, payments, and the like. Alternatively, or in addition, digital content 130/230A may be or include a hybrid of traditional AV and fully immersive VR/AR/MR experiences, such as interactive video.

Flowchart further includes receiving insertion data 126 identifying timecode 236 of timeline 228 (action 462). It is noted that the location within digital content 130/230A that is specified by timecode 236 included in insertion data 126 may be an insertion point for supplemental content, such as one or more ads for example, into digital content 130/230A. Insertion data 126 may be received in action 462 by targeted re-processing software code 110, executed by processing hardware 104 of system 100. For example, as shown in FIG. 1, in some implementations, insertion data 126 may be received by system 100 from content source 116, either via communication network 112 and network communication links 114 or directly via communication link 118. However and as further shown in FIG. 1, in other implementations, insertion data 126 may be received by system 100 from user system 120, via communication network 112 and network communication links 114.

Referring to FIG. 2B in combination with FIGS. 1, 2A, and 4, flowchart 460 further includes encoding digital content 130/230A, using insertion data 126, to provide segmented content 230B having segment boundary 234c at timecode 236, as well as first segment 232c and second segment 232d adjoining segment boundary 234c, wherein first segment 232c precedes segment boundary 234c and second segment 232d succeeds segment boundary 234c with respect to timeline 228 (action 463). It is noted that, in some implementations, segmented content 230B may be or include ABR content. Encoding of digital content 130/230A, using insertion data 126, to provide segmented content 230B in action 463 may be performed by targeted re-processing software code 110, executed by processing hardware 104 of computing platform 102.

In some implementations, flowchart 460 may further include determining, based on segmented content 230B, an optimal sequence of segmented content 230B for re-processing, the optimal sequence including at least one content segment in addition to first segment 232c and second segment 232d (action 464). For example, content at the beginning of first segment 232c, content at the end of second segment 232d, or content at both locations, may have certain attributes that if re-processing were to start or end there, may result in an audio artifact, a video artifact, or both an audio artifact and a video artifact noticeable upon playback of re-processed content 150. The process for identifying an optimal re-processing sequence of segmented content 230B that includes at least first segment 232c and second segment 232d may include a variety of methods to reduce or eliminate such issues. For example, the process for determining an optimal start time and end time for re-processing may consider one or more of content metadata, such as Dolby Vision® shot metadata, scene change detection, chunk boundary complexity analysis, and the like.

It is noted that action 464 is optional, and in some implementations may be omitted from the method outlined by flowchart 460. However, in implementations in which action 464 is included in the method outlined by flowchart 460, action 464 may be performed by targeted re-processing software code 110, executed by processing hardware 104 of computing platform 102. It is noted that in various use case, the one or more segments of segmented content 230B in addition to first segment 232c and second segment 232d that are included in the optimal re-processing sequence may precede first segment 232c, may succeed second segment 232d, or one or more of those segments may precede first segment 232c and one or more of those segments may succeed second segment 232d.

Referring to FIGS. 2C and 3 in combination with FIGS. 1, 2A, 2B, and 4. Flowchart 460 further includes re-processing first segment 232c/332c and second segment 232d/232d, or the optimal sequence determined in action 464, to apply fade-out 252/352 within or to first segment 232c/332c and fade-in 254/354 within or to second segment 232d/332d (action 465). It is noted that re-processing first segment 232c/332c and second segment 232d/332d provides encoded segments having segment boundary 234c configured as an insertion point for supplemental content 340.

As noted above, and as shown in FIG. 3, in some implementations supplemental content 340 may include new content 342, black segment 344a preceding new content 342, and black segment 344b succeeding new content 342. However, in other implementations, supplemental content 340 may include new content 342 and either black segment 344a preceding new content 342 or black segment 344b succeeding new content 342, but not both. In yet other implementations, supplemental content 340 may include new content 342 but may omit both of black segments 344a and 344b. That is to say, in some implementations, supplemental content 340 is new content 342. Moreover, in some implementations, one or both of first segment 232c/332c and second segment 232d/332d may be omitted, and supplemental content 340 including one or both of black segment 344a and black segment 344b may be inserted between originally encoded segments 332b and 332e. It is noted that, in various implementations, supplemental content 340 may be or include new content 342 in the form of one or more ads, such as a single ad, or an ad pod as known in the art.

The re-processing performed in action 465 may be performed by targeted re-processing software code 110, executed by processing hardware 104 of computing platform 102 and confers significant advantages over alternative techniques for configuring digital content 130/230A for insertion of supplemental content such as ads. For example, after re-processing of first segment 232c/332c and second segment 232d/332d to provide encoded segments having segment boundary 234c configured as an insertion point for supplemental content 340, the timeline of segmented content 230B still matches timeline 228 of digital content 130/230A.

In addition, the same playlist for playback of segmented content 230B before re-processing can advantageously be used for playback of segmented content 230B after re-processing to apply fade-out 252/352 within or to segment 232c/332c and fade-in within or to segment 232d/332d. For instance, in implementations in which segmented content 230B takes the form of ABR content, the ABR protocol specifications for segmented content 230B may use a form of playlist that utilizes Uniform Resource Identifiers (URIs), such as Uniform Resource Locators (URLs) for example, for discrete segmented files. In those use cases, an existing playlist for segmented content 230B may be used after re-processing of segments 323c/332c and 232d/332d, in action 465.

With respect to the actions described by flowchart 460, it is noted that actions 461, 462, 463, and 465, or actions 461, 462, 463, 464, and 465, may be performed as automated processes from which human involvement may be omitted.

Thus, the present application discloses systems and methods for targeted re-processing of digital content. The targeted re-processing solution disclosed in the present application enables substantially seamless insertion of supplemental content at segment boundaries of encoded digital content by advantageously re-processing only those segments considered to be necessary to avoid subjective audio or video irregularities produced by the introduction of the supplemental content at those insertion points. Consequently, the present solution advances the state-of-the-art as described above while significantly reducing the time required to re-process, as well as the QC time required in validation, because only targeted sequences of previously encoded digital content are re-processed.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform having a processing hardware and a system memory storing a software code;
the processing hardware configured to execute the software code to:
receive digital content indexed to a timeline;
receive insertion data identifying a timecode of the timeline;
encode the digital content using the insertion data to provide segmented content having a segment boundary at the timecode, a first segment and a second segment adjoining the segment boundary, wherein the first segment precedes the segment boundary and the second segment succeeds the segment boundary;
apply a fade-out within or to the first segment and a fade-in within or to the second segment;
wherein applying the fade-out and the fade-in produces and places the fade-out in the first segment and produces and places the fade-in in the second segment, and provides encoded first and second segments having the segment boundary situated between the fade-out and the fade-in configured as an insertion point for supplemental content.

2. The system of claim 1, wherein the processing hardware is further configured to execute the software code to:
before applying the fade-out and the fade-in, determine, based on the segmented content, an optimal sequence of the segmented content for applying the fade-out and the fade-in, the optimal sequence including at least one content segment in addition to the first segment and the second segment.

3. The system of claim 2, wherein the optimal sequence includes a plurality of content segments in addition to the first segment and the second segment, and wherein at least one of the plurality of content segments precedes the first segment or succeeds the second segment.

4. The system of claim 1, wherein the supplemental content comprises at least one of new content or advertising content.

5. The system of claim 1, wherein the supplemental content comprises new content and a black segment preceding the new content or succeeding the new content.

6. The system of claim 1, wherein the supplemental content comprises new content, a first black segment preceding the new content, and a second black segment succeeding the new content.

7. The system of claim 1, wherein a same playlist for playback of the segmented content before applying the fade-out and the fade-in can be used for playback of the segmented content after re-processing.

8. The system of claim 1, wherein a timeline of the segmented content after applying the fade-out and the fade-in matches the timeline of the digital content.

9. The system of claim 1, wherein the segmented content comprises adaptive bit-rate (ABR) content.

10. A method for use by a system including a computing platform having a processing hardware, and a system memory storing a software code, the method comprising:
receiving, by the software code executed by the processing hardware, digital content indexed to a timeline;
receiving, by the software code executed by the processing hardware, insertion data identifying a timecode of the timeline;
encoding the digital content, by the software code executed by the processing hardware using the insertion data to provide segmented content having a segment boundary at the timecode, a first segment and a second segment adjoining the segment boundary, wherein the first segment precedes the segment boundary and the second segment succeeds the segment boundary;

applying, by the software code executed by the processing hardware, a fade-out within or to the first segment and a fade-in within or to the second segment;

wherein applying the fade-out and the fade-in produces and places the fade-out in the first segment and produces and places the fade-in in the second segment, and provides encoded first and second segments having the segment boundary situated between the fade-out and the fade-in configured as an insertion point for supplemental content.

11. The method of claim 10, further comprising:

before applying the fade-out and the fade-in, determining, by the software code executed by the processing hardware based on the segmented content, an optimal sequence of the segmented content for applying the fade-out and the fade-in, the optimal sequence including at least one content segment in addition to the first segment and the second segment.

12. The method of claim 11, wherein the optimal sequence includes a plurality of content segments in addition to the first segment and the second segment, and wherein at least one of the plurality of content segments precedes the first segment or succeeds the second segment.

13. The method of claim 10, wherein the supplemental content comprises at least one of new content or advertising content.

14. The method of claim 10, wherein the supplemental content comprises new content and a black segment preceding the new content or succeeding the new content.

15. The method of claim 10, wherein the supplemental content comprises new content, a first black segment preceding the new content, and a second black segment succeeding the new content.

16. The method of claim 10, wherein a same playlist for playback of the segmented content before applying the fade-out and the fade-in can be used for playback of the segmented content after re-processing.

17. The method of claim 10, wherein a timeline of the segmented content after applying the fade-out and the fade-in matches the timeline of the digital content.

18. The method of claim 10, wherein the segmented content comprises adaptive bit-rate (ABR) content.

19. The system of claim 1, wherein the processing hardware is further configured to execute the software code to:

before applying the fade-out and the fade-in, determine, based on the segmented content, an optimal sequence of the segmented content for applying the fade-out and the fade-in, wherein the optimal sequence includes a plurality of content segments in addition to the first segment and the second segment, and wherein at least one of the plurality of content segments precedes the first segment and at least one of the plurality of content segments succeeds the second segment.

20. The method of claim 10, further comprising:

before applying the fade-out and the fade-in, determining, by the software code executed by the processing hardware based on the segmented content, an optimal sequence of the segmented content for applying the fade-out and the fade-in, wherein the optimal sequence includes a plurality of content segments in addition to the first segment and the second segment, and wherein at least one of the plurality of content segments precedes the first segment and at least one of the plurality of content segments succeeds the second segment.

* * * * *